US005630898A

United States Patent [19]

Judkins

[11] Patent Number: 5,630,898

[45] Date of Patent: May 20, 1997

[54] PLEATED AND CELLULAR MATERIALS AND METHOD FOR THE MANUFACTURE THEREOF USING A SPLITTER

[76] Inventor: Ren Judkins, 46 Newgate Rd., Pittsburgh, Pa. 15202

[21] Appl. No.: 412,875

[22] Filed: Mar. 29, 1995

[51] Int. Cl.[6] ................................ B32B 31/18; E06B 3/48

[52] U.S. Cl. .......................... 156/204; 156/197; 156/250; 156/291; 156/292; 160/84.05; 428/116

[58] Field of Search .................................... 156/197, 204, 156/250, 271, 291, 292; 160/84.01, 84.05; 428/116

[56] References Cited

U.S. PATENT DOCUMENTS

| | | | |
|---|---|---|---|
| 2,803,578 | 8/1957 | Holland | 156/197 |
| 4,450,027 | 5/1984 | Colson | 156/193 |
| 4,676,855 | 6/1987 | Anderson | 156/193 |
| 4,685,986 | 8/1987 | Anderson | 156/197 |
| 4,974,656 | 12/1990 | Judkins . | |
| 4,999,073 | 3/1991 | Kao | 156/197 |
| 5,015,317 | 5/1991 | Corey et al. | 156/197 |
| 5,043,038 | 8/1991 | Colson | 156/193 |
| 5,106,444 | 4/1992 | Corey et al. | 156/197 |
| 5,160,563 | 11/1992 | Kutchmarek et al. | 156/197 |
| 5,193,601 | 3/1993 | Corey et al. . | |

FOREIGN PATENT DOCUMENTS

| | | |
|---|---|---|
| 2144280 | 9/1995 | Canada . |

*Primary Examiner*—Daniel Stemmer

*Attorney, Agent, or Firm*—Buchanan Ingersoll, P.C.; Lynn J. Alstadt

[57] ABSTRACT

A tabbed honeycomb structure or pleated panel is made from a stack of collapsed multi-cellular material. The stack is split at bond lines thereby forming the panels of pleated or honeycomb material having a joint tab on one face.

13 Claims, 3 Drawing Sheets

FIG. 4
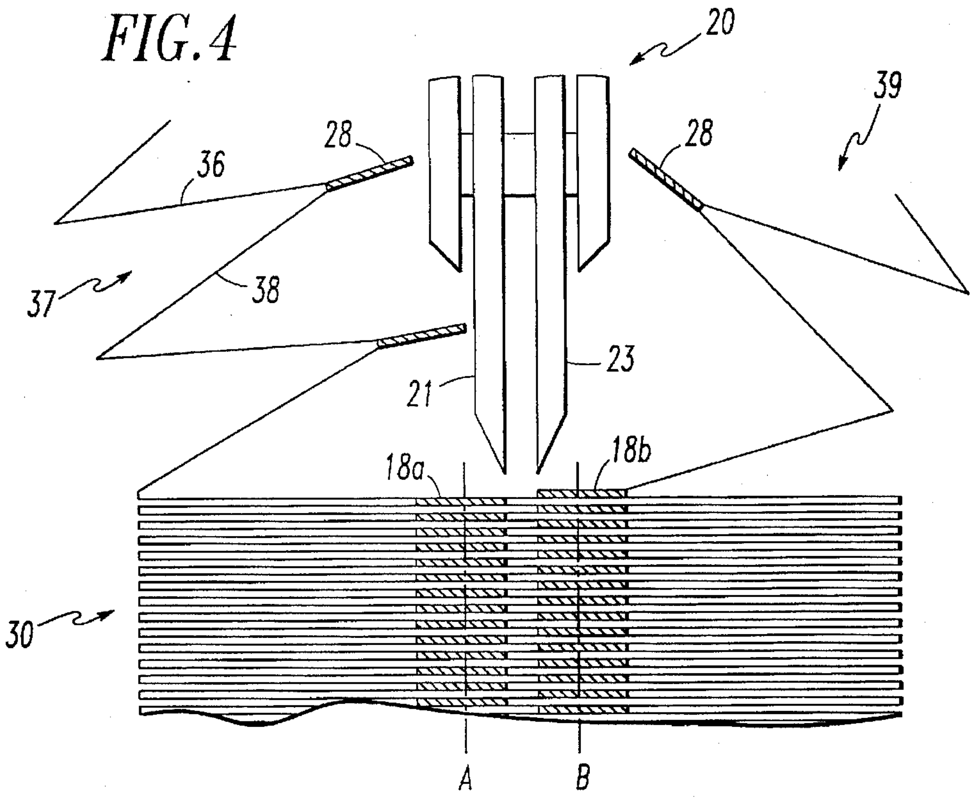
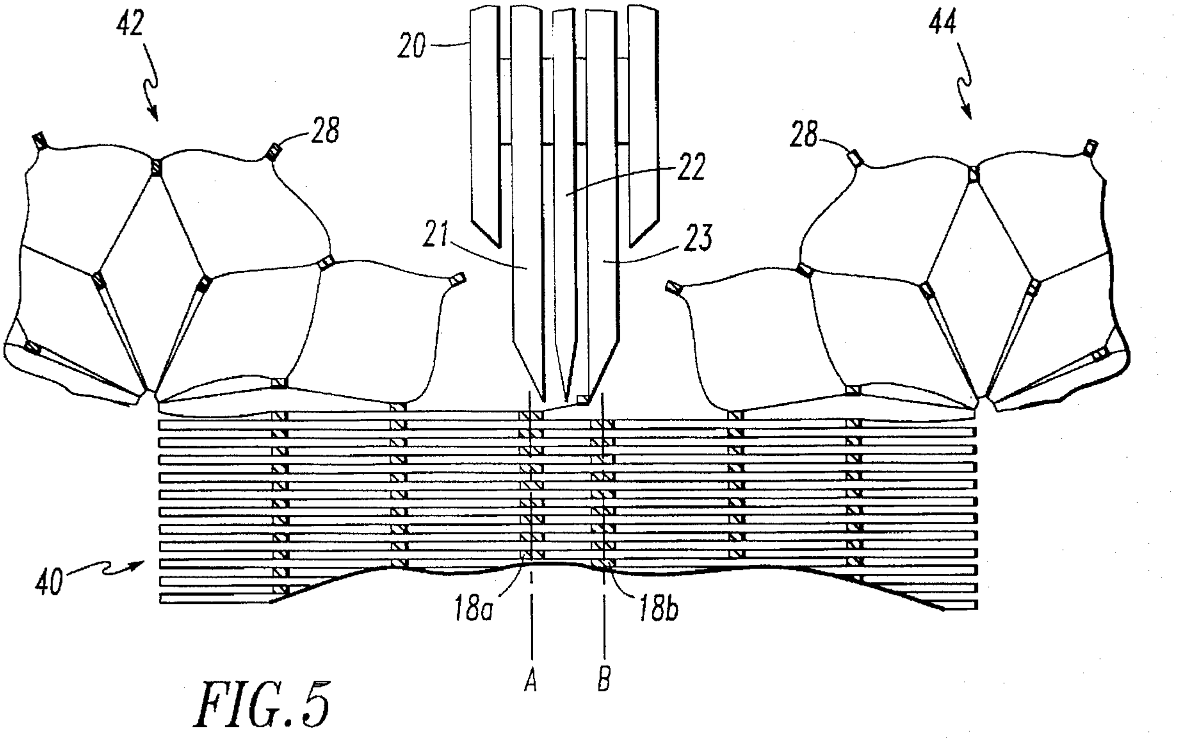
FIG. 5

PLEATED AND CELLULAR MATERIALS AND METHOD FOR THE MANUFACTURE THEREOF USING A SPLITTER

BACKGROUND OF THE INVENTION

1. Field of the Invention

This invention relates to a pleated panel construction and method for the manufacture thereof and more particularly to a pleated shade construction, which results in an improved method for manufacturing variations of the well-known cellular shade constructions and other pleated shade constructions.

2. Description of the Prior Art

There are two basic types of folded window coverings. A first pleated type consists of a single layer of corrugated material. The other is a more complex cellular type where pleated layers are joined or folded strips are stacked to form a series of collapsible cells. This latter type is known to have favorable thermal insulation properties because of the static air mass which is trapped between the layers of material when the cells are in the expanded position. The single-layer type, on the other hand, is favored for its appearance in some cases, and is less expensive to manufacture. There is also a tabbed single layer of corrugated material which is disclosed in my U.S. Pat. No. 4,974,656.

There are two basic approaches to making cellular products and tabbed panels from a roll of fabric material. The first method pleats or bonds the material transverse to the length of the roll and the second method pleats or bonds longitudinally along its length.

The output of the transverse method cannot be wider than the roll width of the original material. The longitudinal method is limited in the types of patterns that can be printed on the material because alignment is random. The transverse methods have been limited to a single layer, a single tabbed layer or a triple layer where there are three continuous surfaces that create a panel of double cells.

There is a need to have a transverse process that can make a panel of single cells. There is also a need to increase the speed of production output of single, double and triple layers.

There are several methods of producing the cellular shades. Most similar to the pleated, single-panel method is Anderson U.S. Pat. No. 4,685,986. This method joins together two single-panel pleated lengths of material by adhesively bonding them together at opposing pleats. Other methods depart from this Anderson patent by joining together a series of longitudinally folded strips, rather than continuous sheets of pleated material. Such methods are shown in Colson U.S. Pat. No. 4,450,027, and in Anderson U.S. Pat. No. 4,676,855. In the Colson patent, strips of fabric are longitudinally folded into a U-shape and adhered on top of one another, whereas in the Anderson patent these strips are Z-shaped and are adhered in an interlocking position.

In U.S. Pat. No. 5,043,038 Colson discloses a method of cutting a honeycomb structure longitudinally to divide them into two tabbed single layer pleated panels. That honeycomb structure was formed from U-shaped strips as taught in Colson's U.S. Pat. No. 4,450,027 by a process of winding the foldable material around a base apparatus, applying glue to one face of the material and adhering each layer to the adjacent layer. This method tends to cause the tab to wrinkle because the stack is wrapped on a slightly curved mandrel. Also, because the material layers are wound in a stack, the length of the panels of final product are limited to the height of the wrapped stack and the ends of the stack are wasted.

Another method for making cellular shades is disclosed in U.S. Pat. Nos. 5,015,317; 5,106,444 and 5,193,601 to Corey et al. In that process fabric material is run through a production line that first screen prints the fabric and then applies thermoplastic glue lines at selected intervals. The fabric is then pleated, stacked, and placed in an oven to both set the pleats and bond the material at the glue lines.

There is a need for a method to utilize the current transverse processing equipment technology to make a larger variety of single and multi-layer panels at a faster rate.

SUMMARY OF THE INVENTION

The present method overcomes the problems and achieves the objectives indicated above by providing a method of manufacturing a pleated shade or a honeycomb structure by a means of splitting honeycomb or multicellular material into two or more tabbed, pleated panels or tabbed, cellular panels.

According to the teachings of the present invention, a stack of folded fabric is bonded to form a honeycomb structure having a series of cells connected together along bond lines. An interface region is present between adjacent cells which forms the bridge between horizontally adjacent stacks of cells. At least one bond line applied between adjacent fabric walls defines each interface region. These interface regions are split to form separate tabbed, pleated panels or separate panels of cells having tabs on one face between each pair of pleats. These tabs extending between each pleated panel or between individual cells, as the case may be, extend at least 1/16" in length. To simplify handling and to create a uniform appearance the tabs are identical in size resulting from a straight-line split along a distinct perpendicular plane, but the invention is not limited to this.

BRIEF DESCRIPTION OF THE DRAWINGS

FIG. 4 is a diagram showing a double cell honeycomb stack being split into tabbed panels.

FIG. 5 is a diagram of a five cell honeycomb stack being split into two double honeycomb panels having tabs which are formed on one face of both panels.

DESCRIPTION OF THE PREFERRED EMBODIMENTS

Figure 1:
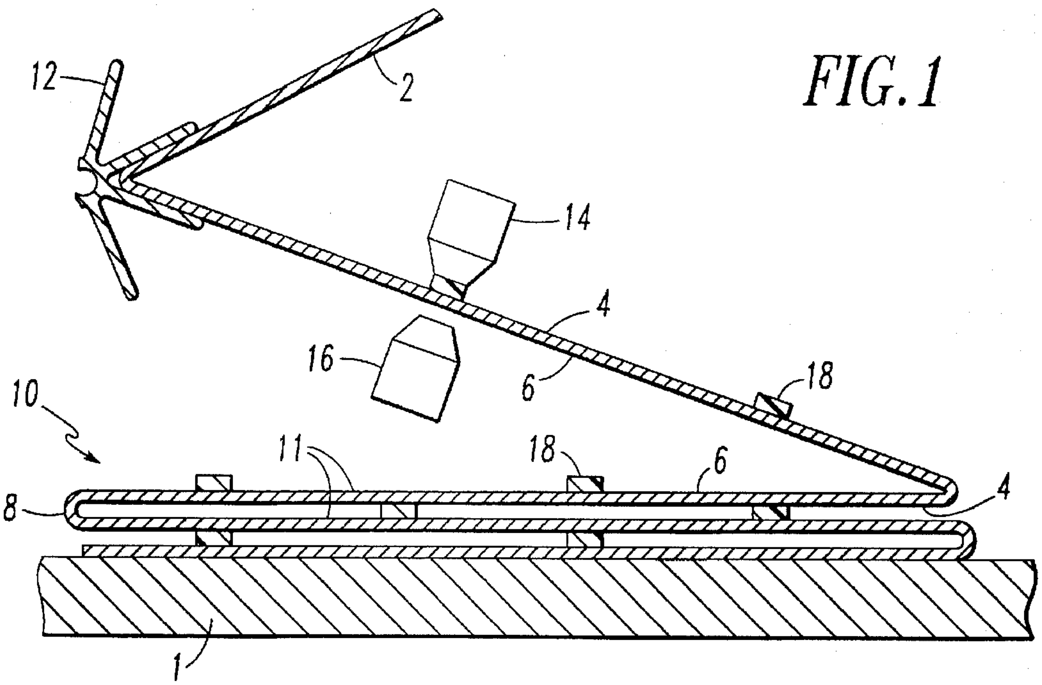
FIGS. 1 and 2 are diagrams showing how the honeycomb stack is formed.
Figure 2:
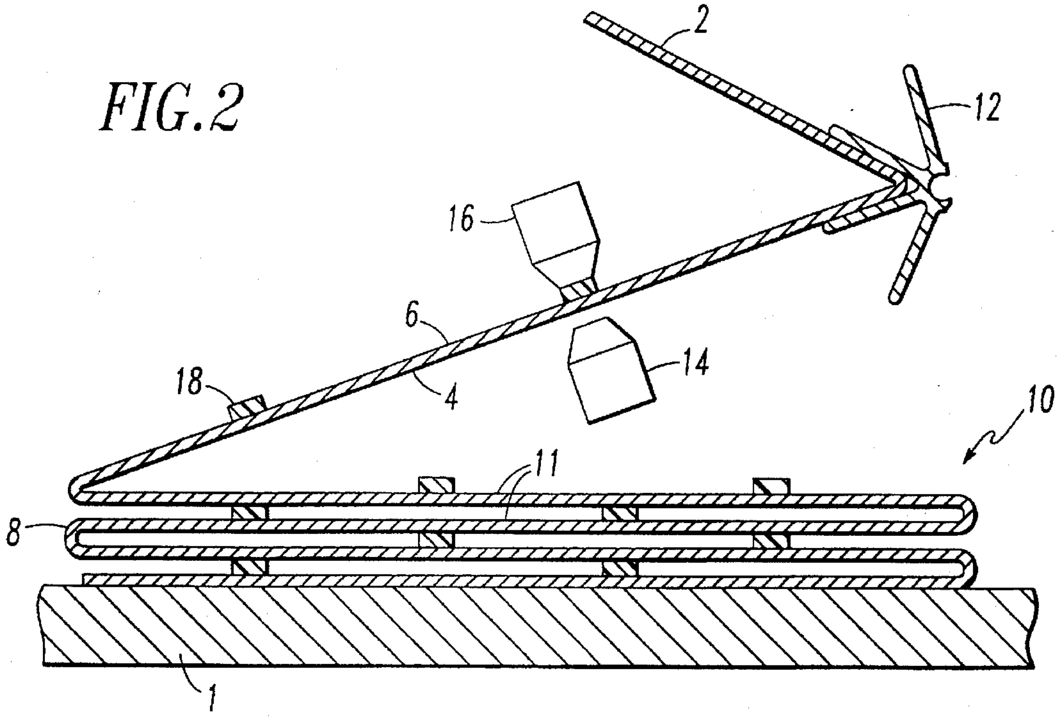

Referring to FIGS. 1 and 2, I provide a sheet of pleated fabric 2 which is folded on work surface 1 to form a fabric stack 10. Pleated fabric 2 is delivered to the work surface by a sprocket or other feed mechanism 12 which draws the fabric from a source of supply which is not shown. Glue applicators 14 and 16 apply bond lines 18 of hot melt glue on a surface 4 of the fabric. When the fabric is in the position shown in FIG. 1 surface 4 is facing upward. After the fabric has been laid from right to left across the length of stack 10, the fabric is folded as shown in FIG. 2. The movement of the stack relative to the fabric being supplied folds the fabric 2 back over the stack forming a pleat 8. Now surface 4 is facing down and opposite surface 6 is facing up. In that position glue applicator 16 applies lines of glue on surface 6. The fabric is laid across the stack from left to right. The process is repeated until a complete stack 10 of fabric layers 11 has been created. That stack will then have sets of bond lines in vertical planes transverse to the pleat faces. Then, the stack is placed in an oven to melt the glue and bond the pairs of opposing faces together. If desired, irons could be provided to press the pleats after a selected number of passes. Although I prefer to create bond lines using an adhesive, particularly a hot melt adhesive, it is also possible to create the bond lines using a heat welder. After each pair of opposed pleat faces is laid they are welded together. I have found that a heat welder will bond two overlying sheets without affecting a third sheet below the sheets which are bonded.

In FIGS. 1 and 2 I show the adhesive lines being applied to pleated fabric. If desired, one can apply the adhesive to the fabric first and then pleat the fabric.

Figure 3:
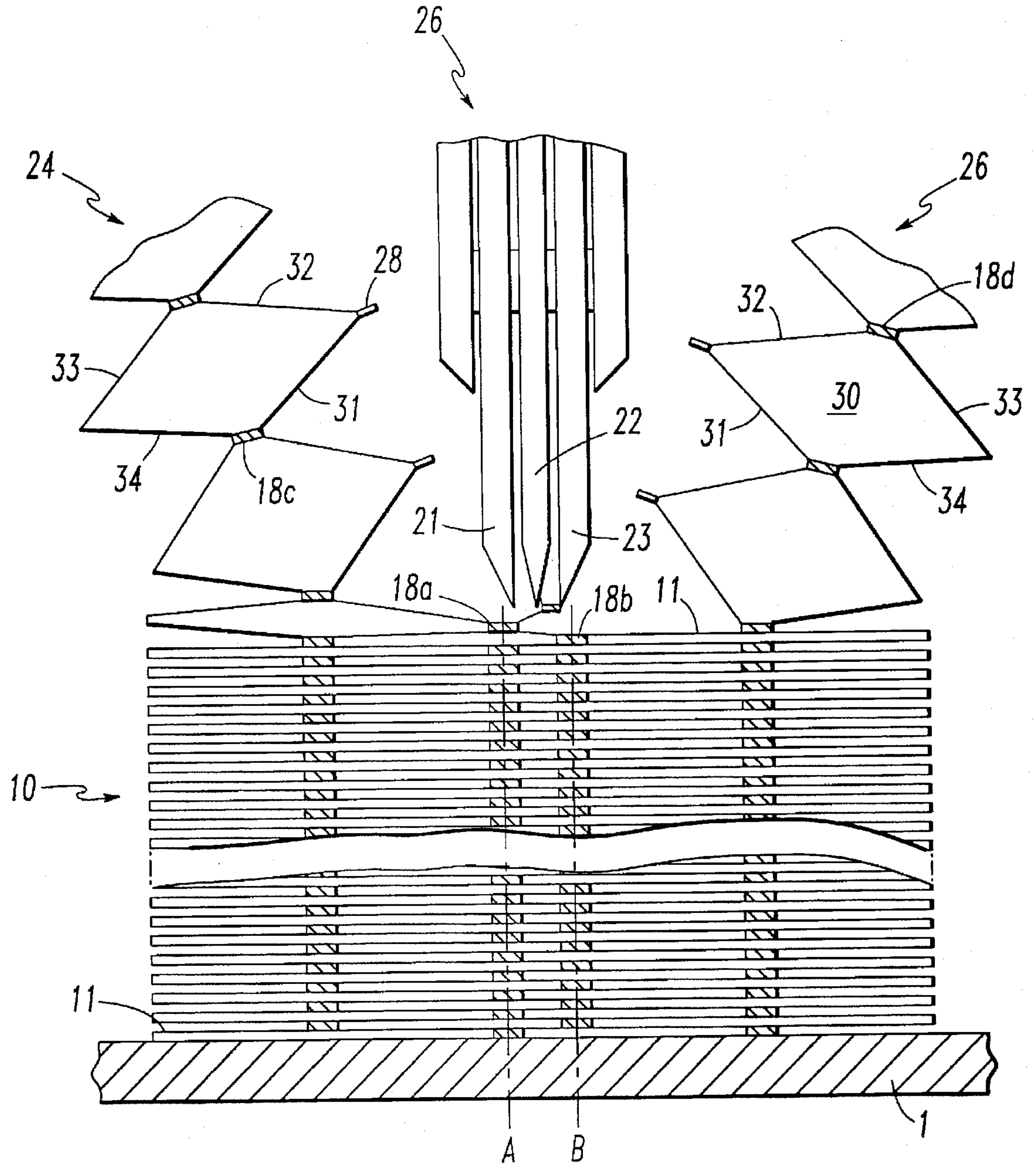
FIG. 3 is a diagram showing a triple cell honeycomb stack being split into two tabbed honeycomb panels according to the teachings of the present invention.

Referring now to FIG. 3, a splitter 20 is positioned above the stack so that blades 21 and 23 are positioned directly above adjacent glue lines 18*a* and 18*b*. Splitter 20 is then moved through the stack thereby cutting the stack along the glue lines. These cuts form two single cell honeycomb panels 24 and 26. Preferably, the knife cuts between two planes of glue lines A and B so that after cutting the set of glue lines 18*a* in plane A are in one panel 24 and the set of glue lines 18*b* in plane B are in a second panel 26. Alternatively, the knife could cut through a plane of glue lines so that a portion of each glue line is in each panel. Each cell 30 has four primary side walls 31, 32, 33 and 34. Because of the method of manufacture a tab 28 has been formed between adjacent pleat faces or cell sidewalls 32 and 33 and contrast opposite side walls 33 and 34 meet to form a standard pleat. Adjacent cells are connected together by glue lines 18*c* and 18*d*. I prefer to provide a standard pleat face of ½" with a ¼" bridge formed by glue lines 18*c* and 18*d*. Preferably the tab has a width of 1/16" creating an overall width of 1 5/16". The region between glue lines 18 and 18*b* is preferably ⅛". Thus, the width of stack 10 would be 2¾" to make two panels of this preferred fabric size. Other standard sizes of pleat faces ranging from ¼" to about 1" can easily be made with this process. Indeed, the pleats can be any desired size.

I prefer that cutter 20 have two outside knives 21 and 23 and one inside knife as shown in FIG. 3. The use of two outside knives allows for a better cutting of the glue lines and for a greater tolerance for error of a glue plane placement and thickness. The center knife cuts the accordion pleat remnant in half so that the resulting smaller strips can easily be drawn off by vacuum.

FIG. 4 shows a double cell honeycomb stack 30 being split. The cells are formed by sets of glue lines 18*a* and 18*b* in planes A and B. The double cells are split by knives 21 and 23 along a perpendicular plane through the glue lines. This method forms two panels of pleated material 37 and 39 each having a joint tab 28 on one face between each pair of adjacent pleat faces 36 and 38. The joint tabs 28 extending between each pair of pleats preferably should measure at least 1/16" in length.

FIG. 5 is a diagram of a five-cell honeycomb stack 40 being split. The five-cell honeycomb stack is split along a cutting plane parallel to the planes A and B containing glue lines 18*a* and 18*b*. This method forms two panels 42 and 44 of double cell honeycomb material having tabs 28 on one face. The splitter shown in FIG. 5, generally designated as 20, is comprised of a center blade 22 which pierces the stack 40 and two blades 21 and 23 that cut the interior edge of each alternating adhesive bond lines 18*a* and 18*b*.

Although I have shown the tabs being formed from a single glue line, tab 28 may be formed by either means of a single or a double bond or line of adhesive. The joint tabs in the separated panels in the figures are the same size. However, this is not necessary. Also, I have shown the glue lines extending to the ends of the tabs. But, this is not necessary.

A major advantage of the present method over the prior art is the gluing machine can make two, tabbed, pleated layers; two, tabbed, single-cells; or two tabbed, double-cell layers by changing the pump pressure and the orifice configuration on the glue heads. Such a change can be made in less than hour. Since the splitter is much faster and simpler than the gluing process, it is a less expensive machine and can handle the output of 3 or 4 gluing machines.

The stack of the present invention can be formed on several types of prior art pleating machines modified to have glue heads and to fold the fabric into the stack after gluing, or by simply modifying the glue heads on machines which have them to place more glue lines at different intervals. Such modified machines should be able to put out nearly twice the effective output than they did prior to modification.

Although I have shown certain present preferred embodiments of my method and the pleated and honeycomb structures made therefrom, it should be distinctly understood that my invention is not limited thereto, but may be varicously embodied within the scope of the following claims.

I claim:

1. A method for producing a pleated and tabbed fabric comprising the steps of:

pleating a sheet of material to form a stack of pleated material having fabric layers and pairs of opposed pleat faces;

applying at least one bond line between each pair of opposed pleat faces so that the applied bond lines are in one of two bond line planes which are normal to the pleat faces;

stacking the opposed pleat faces on top of one another to bond the pleat faces together thereby forming a stack of cellular material having at least two sets of bond lines each set aligned in a bond plane transverse to the pleat lines; and removing and discarding a portion of each fabric layer adjacent a bond plane to form at least one panel of pleated and tabbed fabric.

2. The method of claim 1 wherein the panels have a joint tab extending between each pair of pleats which tab is at least 1/16" in length.

3. The method of claim 2 wherein all joint tabs are identical in size.

4. The method of claim 1 wherein the pleated panels are of a material suitable for use as a window covering.

5. The method of claim 1 also comprising the step of applying a third plane of bond lines between and normal to selected opposed pleat faces so that after cutting the stack along a line normal to the pleat faces a panel of cellular material is formed.

6. The method of claim 1 also comprising the step of applying a plane of bond lines between and normal to selected opposed pleat faces so that after cutting the stack along a line normal to the pleat faces two panels of cellular material are formed.

7. The method of claim 1 wherein the bond lines are formed by one of an adhesive, a hot melt adhesive and an ultrasonic bond.

8. The method of claim 1 wherein portions of the fabric layers between bond planes are removed.

9. The method of claim 8 wherein the removed portions of the fabric layers are not longer than ⅛ inch.

10. The method of claim 1 wherein the portions of fabric are removed by cutting the stack through the bond planes.

11. The method of claim 10 wherein a pair of knives are used to cut through the bond planes.

12. The method of claim 11 also comprising cutting the stack between the bond planes using a third knife positioned between the pair of knives.

13. The method of claim 1 also comprising drawing a vacuum for removing the portions of fabric layers.

* * * * *